(12) United States Patent
Tran et al.

(10) Patent No.: US 11,808,997 B1
(45) Date of Patent: Nov. 7, 2023

(54) HETEROGENEOUS PHOTONIC INTEGRATED CIRCUITS WITH DOPED WAVEGUIDES

(71) Applicant: Nexus Photonics, Inc., Goleta, CA (US)

(72) Inventors: Minh Tran, Goleta, CA (US); Tin Komljenovic, Goleta, CA (US); Chong Zhang, Santa Barbara, CA (US)

(73) Assignee: Nexus Photonics Inc., Goleta, CA (US)

( * ) Notice: Subject to any disclaimer, the term of this patent is extended or adjusted under 35 U.S.C. 154(b) by 0 days.

(21) Appl. No.: 17/947,714

(22) Filed: Sep. 19, 2022

(51) Int. Cl.
  *G02B 6/42* (2006.01)
  *G02B 6/35* (2006.01)
(52) U.S. Cl.
  CPC ......... *G02B 6/4215* (2013.01); *G02B 6/3572* (2013.01); *G02B 6/4224* (2013.01)
(58) Field of Classification Search
  CPC ... G02B 6/4215; G02B 6/3572; G02B 6/4224
  See application file for complete search history.

(56) References Cited

U.S. PATENT DOCUMENTS

| | | | | |
|---|---|---|---|---|
| 5,497,264 A * | 3/1996 | Bayart | ................. | H01S 3/1001 359/337.2 |
| 6,288,835 B1 * | 9/2001 | Nilsson | ............... | H01S 3/06729 359/341.5 |
| 6,445,494 B1 * | 9/2002 | Nilsson | ............... | H01S 3/06729 359/341.1 |
| 6,654,390 B2 * | 11/2003 | Spiegelberg | ............ | H01S 3/063 372/6 |
| 6,700,697 B2 * | 3/2004 | Nikolajsen | ............ | H01S 3/0635 359/341.32 |
| 6,884,327 B2 * | 4/2005 | Pan | ....................... | C23C 14/044 427/259 |
| 7,039,289 B1 * | 5/2006 | Mendoza | ............ | G02B 6/12007 385/132 |
| 7,224,854 B2 * | 5/2007 | Ellwood, Jr. | ............ | G02B 6/02 385/11 |
| 7,565,084 B1 * | 7/2009 | Wach | ...................... | H04J 14/04 398/201 |
| 7,826,702 B2 * | 11/2010 | Dawes | .................... | G02B 6/132 385/129 |

(Continued)

*Primary Examiner* — Andrew Jordan
(74) *Attorney, Agent, or Firm* — LEEPI

(57) ABSTRACT

A device comprises first, second and third elements fabricated on a common substrate. The first element comprises an active waveguide structure comprising electrically pumped optical source supporting a first optical mode. The second element comprises a passive waveguide structure supporting a second optical mode in at least part of the second element. The third element, at least partly butt-coupled to the first element, comprises an intermediate waveguide structure supporting intermediate optical modes. At least part of the second element supports at least one optical mode that interacts with rare-earth dopants. A tapered waveguide structure in at least one of the second and the third elements facilitates efficient adiabatic transformation between the second optical mode and at least one of the intermediate optical modes. No adiabatic transformation occurs between any of the intermediate optical modes and the first optical mode. Mutual alignments of the elements are defined using lithographic alignment marks.

18 Claims, 7 Drawing Sheets

(56) References Cited

U.S. PATENT DOCUMENTS

| | | | | |
|---|---|---|---|---|
| 7,965,949 B1* | 6/2011 | Wach | | H04J 14/04 |
| | | | | 398/143 |
| 8,045,832 B2* | 10/2011 | Pan | | G02B 6/1228 |
| | | | | 385/43 |
| 8,218,151 B2* | 7/2012 | Peled | | G01N 21/7703 |
| | | | | 356/477 |
| 8,521,038 B1* | 8/2013 | Wach | | H04B 10/506 |
| | | | | 398/201 |
| 8,767,290 B2* | 7/2014 | Castagna | | H01S 3/0632 |
| | | | | 359/344 |
| 9,065,572 B1* | 6/2015 | Wach | | H04J 14/04 |
| 9,316,592 B2* | 4/2016 | Peled | | G01N 21/7703 |
| 9,711,930 B2* | 7/2017 | Pitwon | | H01S 3/0906 |
| 10,468,849 B1* | 11/2019 | Bradley | | H01S 3/163 |
| 10,641,959 B1* | 5/2020 | Park | | G02B 6/1228 |
| 10,718,898 B1* | 7/2020 | Park | | G02B 6/1228 |
| 10,802,120 B1* | 10/2020 | LaChapelle | | G01S 17/10 |
| 10,845,480 B1* | 11/2020 | Shah | | G01S 17/10 |
| 10,859,764 B2 | 12/2020 | Park | | |
| 11,119,219 B1* | 9/2021 | LaChapelle | | G01S 7/484 |
| 11,209,592 B2* | 12/2021 | Zhang | | G02B 6/12004 |
| 11,287,573 B1* | 3/2022 | Zhang | | G02B 6/1228 |
| 11,320,588 B1* | 5/2022 | Mazed | | G16H 10/40 |
| 11,467,265 B2* | 10/2022 | LaChapelle | | G01S 7/4818 |
| 11,467,266 B2* | 10/2022 | LaChapelle | | G01S 7/4814 |
| 11,480,734 B2* | 10/2022 | Park | | G02B 6/1228 |
| 11,719,883 B1* | 8/2023 | Zhang | | G02B 6/1228 |
| | | | | 385/14 |
| 2002/0030881 A1* | 3/2002 | Nilsson | | H01S 3/06729 |
| | | | | 359/341.1 |
| 2003/0137722 A1* | 7/2003 | Nikolajsen | | C03C 13/045 |
| | | | | 359/341.1 |
| 2003/0137999 A1* | 7/2003 | Spiegelberg | | H01S 3/063 |
| | | | | 372/6 |
| 2003/0173208 A1* | 9/2003 | Pan | | G02B 6/132 |
| | | | | 427/163.2 |
| 2003/0175142 A1* | 9/2003 | Milonopoulou | | C04B 35/6261 |
| | | | | 419/49 |
| 2005/0175287 A1* | 8/2005 | Pan | | C23C 14/044 |
| | | | | 385/28 |
| 2005/0180722 A1* | 8/2005 | Ellwood, Jr. | | B82Y 20/00 |
| | | | | 385/147 |
| 2005/0180723 A1* | 8/2005 | Ellwood, Jr. | | G02F 1/095 |
| | | | | 385/147 |
| 2005/0183946 A1* | 8/2005 | Pan | | G02B 6/1228 |
| | | | | 204/192.15 |
| 2005/0201655 A1* | 9/2005 | Ellwood, Jr. | | G02B 6/276 |
| | | | | 385/11 |
| 2005/0201715 A1* | 9/2005 | Ellwood, Jr. | | G02B 6/2746 |
| | | | | 385/147 |
| 2006/0042322 A1* | 3/2006 | Mendoza | | G02B 6/124 |
| | | | | 65/390 |
| 2010/0231920 A1* | 9/2010 | Peled | | G01N 21/7703 |
| | | | | 356/477 |
| 2011/0122485 A1* | 5/2011 | Castagna | | H01S 3/0632 |
| | | | | 359/344 |
| 2012/0244633 A1* | 9/2012 | Peled | | G01N 21/7703 |
| | | | | 422/69 |
| 2016/0156147 A1* | 6/2016 | Raino | | G02B 6/1228 |
| | | | | 977/774 |
| 2016/0337727 A1* | 11/2016 | Graves | | G02B 6/32 |
| 2017/0155224 A1* | 6/2017 | Pitwon | | H01S 3/0637 |
| 2017/0187166 A1* | 6/2017 | Raino | | G02B 6/125 |
| 2020/0233149 A1* | 7/2020 | Park | | G02B 6/1228 |
| 2020/0284979 A1* | 9/2020 | Park | | G02B 6/12004 |
| 2021/0055387 A1* | 2/2021 | LaChapelle | | G01S 7/4917 |
| 2021/0055390 A1* | 2/2021 | LaChapelle | | G01S 7/4814 |
| 2021/0055391 A1* | 2/2021 | LaChapelle | | G01S 17/26 |
| 2021/0088657 A1* | 3/2021 | Shah | | G01S 17/42 |
| 2021/0088727 A1* | 3/2021 | Park | | G02B 6/13 |
| 2021/0373235 A1* | 12/2021 | Zhang | | G02B 6/1228 |
| 2022/0043115 A1* | 2/2022 | LaChapelle | | G01S 7/4813 |
| 2022/0043127 A1* | 2/2022 | LaChapelle | | G01S 7/484 |
| 2022/0043149 A1* | 2/2022 | LaChapelle | | G01S 7/4814 |
| 2022/0043202 A1* | 2/2022 | LaChapelle | | H01S 5/0265 |
| 2022/0120970 A1* | 4/2022 | Zhang | | G02B 6/14 |
| 2022/0123516 A1* | 4/2022 | Guo | | G02F 1/353 |
| 2022/0236417 A1* | 7/2022 | LaChapelle | | G01S 17/32 |
| 2022/0291348 A1* | 9/2022 | LaChapelle | | H01S 3/0085 |
| 2022/0291349 A1* | 9/2022 | LaChapelle | | H01S 5/50 |
| 2022/0334231 A1* | 10/2022 | Shah | | G01S 17/26 |
| 2023/0111486 A1* | 4/2023 | Shah | | G01S 7/4865 |
| | | | | 356/5.01 |
| 2023/0121874 A1* | 4/2023 | Bakopoulos | | H01S 3/2383 |
| | | | | 385/14 |
| 2023/0213628 A1* | 7/2023 | LaChapelle | | G01S 17/894 |
| | | | | 356/5.01 |
| 2023/0244034 A1* | 8/2023 | Malik | | G02B 6/13 |
| | | | | 385/14 |
| 2023/0266532 A1* | 8/2023 | Zhang | | G02B 6/12004 |
| | | | | 385/14 |

* cited by examiner

HETEROGENEOUS PHOTONIC INTEGRATED CIRCUITS WITH DOPED WAVEGUIDES

FIELD OF THE INVENTION

The present invention relates to photonic integrated circuits. More specifically, certain embodiments of the invention relate to improved performance of heterogeneously integrated doped waveguide photonic integrated circuits using dissimilar materials that are optically coupled.

BACKGROUND OF THE INVENTION

Optical amplification is crucial in communication networks and other uses, as it allows light amplification without the need to first convert it to an electrical signal which adds cost and does not scale well for multiple wavelengths/channels. Optical amplification enabled fiber networks to scale the globe and are crucial in many emerging applications as systems are becoming more complex and need to amplify signal becomes more important.

Historically, Erbium-doped fiber amplifier (EDFA) is the most widely used fiber-optic amplifier, mainly made of Erbium-doped fiber (EDF), pump light source, optical couplers, optical isolators, optical filters and other components. The basic working principle of the EDFA is to use the pump light sources, which most often have a wavelength around 980 nm and sometimes around 1450 nm, to excite erbium ions to a state from where they can amplify light in the 1.5-μm wavelength region via stimulated emission. Performance of EDFA amplifiers is state of the art, with high pump utilization (>50%), broadband amplification wavelength band (>80 nm), high gain (>50 dB), low noise figure and flatness that can be controlled/improved via gain-flattening optical filters. Despite all the advantages, that they have several key disadvantages, namely size (assembled from multiple fiber components), cost and the fact they cannot easily be integrated with other semiconductor devices.

There are other types of rare-earth doped fiber amplifiers using different dopants and operating at different wavelengths, examples include ytterbium typically operating between 1-1.1 μm, neodymium operating in multiple wavelength ranges (typically 0.9-0.95 μm, 1-1.1 μm and 1.32-1.35 μm), thulium operating in multiple wavelength ranges (typically 1.45-1.53 μm and 1.7-2.1 μm) and others.

Another common type of amplifier is the semiconductor optical amplifier (SOA) which uses a semiconductor to provide the gain medium. They have a similar structure to e.g. Fabry-Perot laser diodes but with anti-reflection design elements at the end faces. Unlike EDFAs and DWAs (described below) optical amplifiers SOAs are pumped electronically (i.e. directly via an applied current) so a separate pump laser is not required. The advantages of semiconductor optical amplifiers are their small size, ability to be electrically pumped leading to lower cost and ability to be integrated with other semiconductor components. The disadvantages are mainly related to their performance which is generally inferior to EDFAs, as SOA has higher noise, lower gain, moderate polarization dependence, high nonlinearity with fast transient time, and also can generate crosstalk if multiple channels/wavelengths are amplified simultaneously.

A third type of amplifiers are doped waveguide amplifiers (DWAs). In case of Erbium doping EDWAs are a close relative of an EDFA with basic operating principles that are identical to those of the EDFA. Both of them can be used to amplify infrared light at wavelengths in optical communication bands between 1500 and 1600 nm. However, whereas an EDFA is made using a free-standing fiber, an EDWA is typically produced on a planar substrate, sometimes in ways that are very similar to the methods used in general photonic integrated circuits. Therefore, the main advantage of EDWAs over EDFAs lies in their potential to be intimately integrated with other optical components on the same planar substrate while providing similar performance characteristics and significantly reduced costs.

Until today, DWAs (and EDWAs) required external pumps as requirements for complete chip-scale integration required all of the following: (1) Optical pump operating at suitable wavelength range (980 nm or 1450 nm in the case of erbium), (2) waveguides that are transparent at both the pump wavelength and signal wavelength (where amplification happens, 1550 nm wavelength range in the case of erbium), (3) passives that support wavelength selective operation (as will be described below) and (4) ability to dope the waveguide or cladding of the waveguide with suitable rare-element to provide gain. None of the traditional photonic integrated circuit material systems support all the requirements, so DWAs were generally not fully integrated which limited their deployment despite advantageous performance characteristics in several key aspects compared to typical SOAs.

To enable chip-scale DWAs and photonic integrated circuits utilizing rare-earth doped gain, we improve on the recent approach that enables heterogeneous integration of two or more dissimilar materials (defined by the large difference in their refractive indices, generally larger than 0.5 or higher) as described in U.S. Pat. No. 10,859,764 B2 to facilitate wafer-scale integration of rare-earth elements, broadband transparent waveguides supporting both the pump and signal wavelengths and electrically pumped sources used to excite the rare-earth elements (pump wavelength).

Heterogeneous integration includes bonding two or more dissimilar materials and processing them together on wafer scale, removing the need for precise alignment during the bonding of larger pieces or complete wafers of the dissimilar materials, and allowing for mass fabrication. The alignment is generally provided by photolithography enabling very high precision, with misalignments as small as 10 s of nanometers.

Present invention enables fully-integrated, chips scale DWAs and photonic integrated circuits (PICs) utilizing the same fabricated at wafer scale. In particular, embodiments described below are concerned with the detailed design of the optical coupling structures and waveguides necessary for creation of high-performance PICs with DWAs.

DETAILED DESCRIPTION

Described herein are embodiments of a platform for realization of photonic integrated circuits using wafer bonding and deposition of dissimilar materials where optical coupling is improved by use of mode conversion and a butt-coupling scheme, and where doped waveguide amplifiers and components can be realized.

In the following detailed description, reference is made to the accompanying drawings which form a part hereof, wherein like numerals designate like parts throughout, and in which are shown by way of illustration embodiments in which the subject matter of the present disclosure may be practiced. It is to be understood that other embodiments may be utilized, and structural or logical changes may be made without departing from the scope of the present disclosure. Therefore, the following detailed description is not to be taken in a limiting sense, and the scope of embodiments is defined by the appended claims and their equivalents.

The description may use perspective-based descriptions such as top/bottom, in/out, over/under, and the like. Such descriptions are merely used to facilitate the discussion and are not intended to restrict the application of embodiments described herein to any particular orientation. The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

Figure 3:
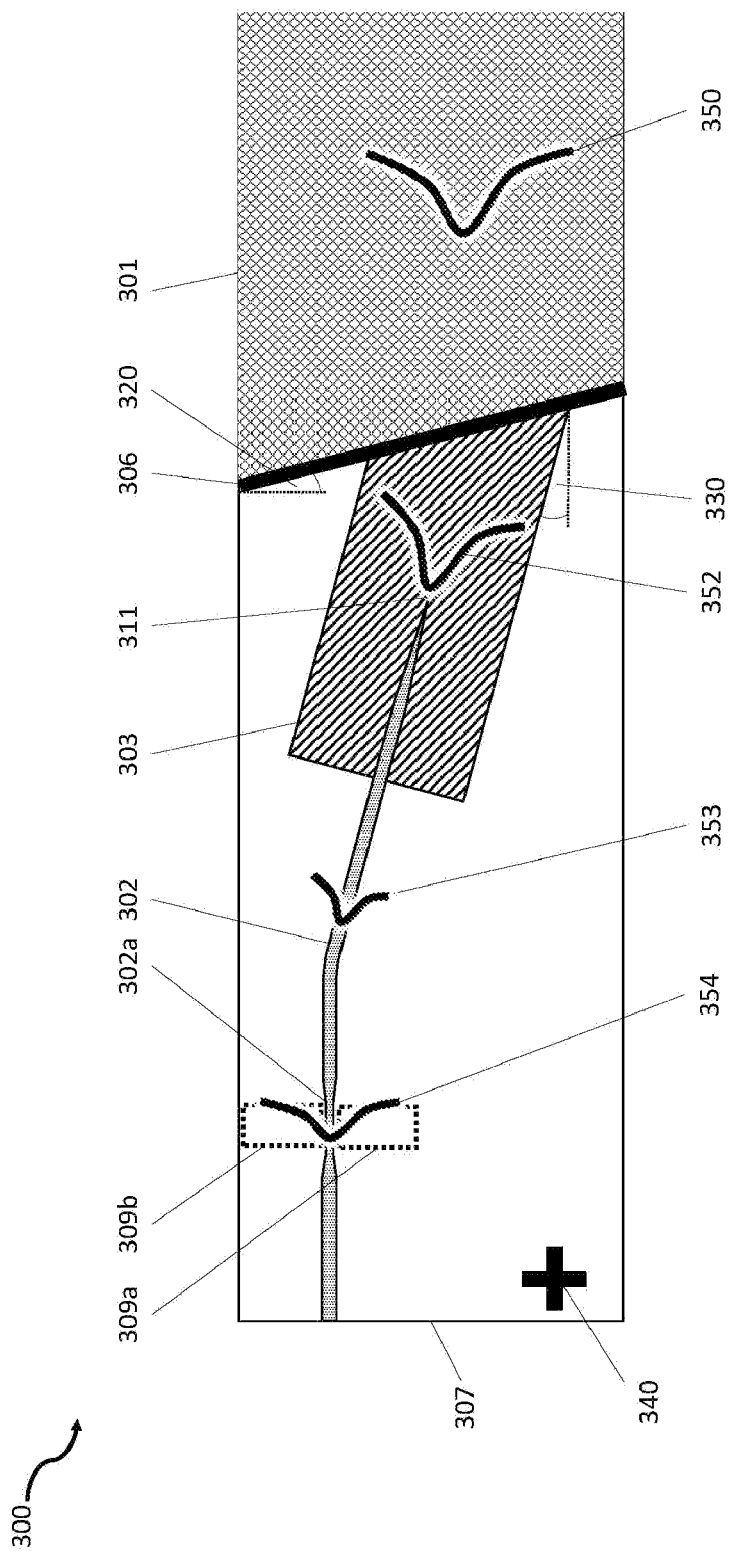
FIG. 3 shows a cross-sectional top-down view of a device according to some embodiments of the present invention.

The term "coupled with," along with its derivatives, may be used herein. "Coupled" may mean one or more of the following. "Coupled" may mean that two or more elements are in direct physical, electrical, or optical contact. However, "coupled" may also mean that two or more elements indirectly contact each other, but yet still cooperate or interact with each other, and may mean that one or more other elements are coupled or connected between the elements that are said to be coupled with each other. The term "directly coupled" means that two or more elements are in direct contact in at least part of their surfaces. The term "butt-coupled" is used herein in its normal sense of meaning an "end-on" or axial coupling, where there is minimal or zero axial offset between the elements in question. The axial offset may be, for example, slightly greater than zero in cases where a thin intervening layer of some sort is formed between the elements, such as e.g. thin coating layer typically used to provide high-reflectivity or anti-reflectivity functionality. It should be noted that the axes of two waveguide structures or elements need not be colinear for them to be accurately described as being butt-coupled. In other words, the interface between the elements need not be perpendicular to either axis. FIG. 3 embodiments discussed below are exemplary of such possibilities.

The terms "active device", "active structure" or otherwise "active" element, part, or component may be used herein. A device or a part of a device called active is capable of direct light generation, amplification, attenuation, modulation and/or detection via electrical contacts. This is in contrast to what we mean by a "passive device" whose principal function is to confine and guide light, and/or provide splitting, combining, filtering and/or other functionalities that are commonly associated with passive devices. Some passive devices can provide functions overlapping with active device functionality, e.g., phase tuning implemented using thermal or similar effects that can provide modulation. Furthermore, passive devices can provide optical amplification by utilizing rare-earth elements as will be described below, but such rare-earth elements have to be correspondingly pumped by an external source (i.e. they cannot be directly pumped with electrical contacts as active device). No absolute distinction should be assumed between "active" and "passive" based purely on material composition or device structure. A silicon device, for example, may be considered active under certain conditions of modulation, or detection of low wavelength radiation, but passive in most other situations.

Figure 1:
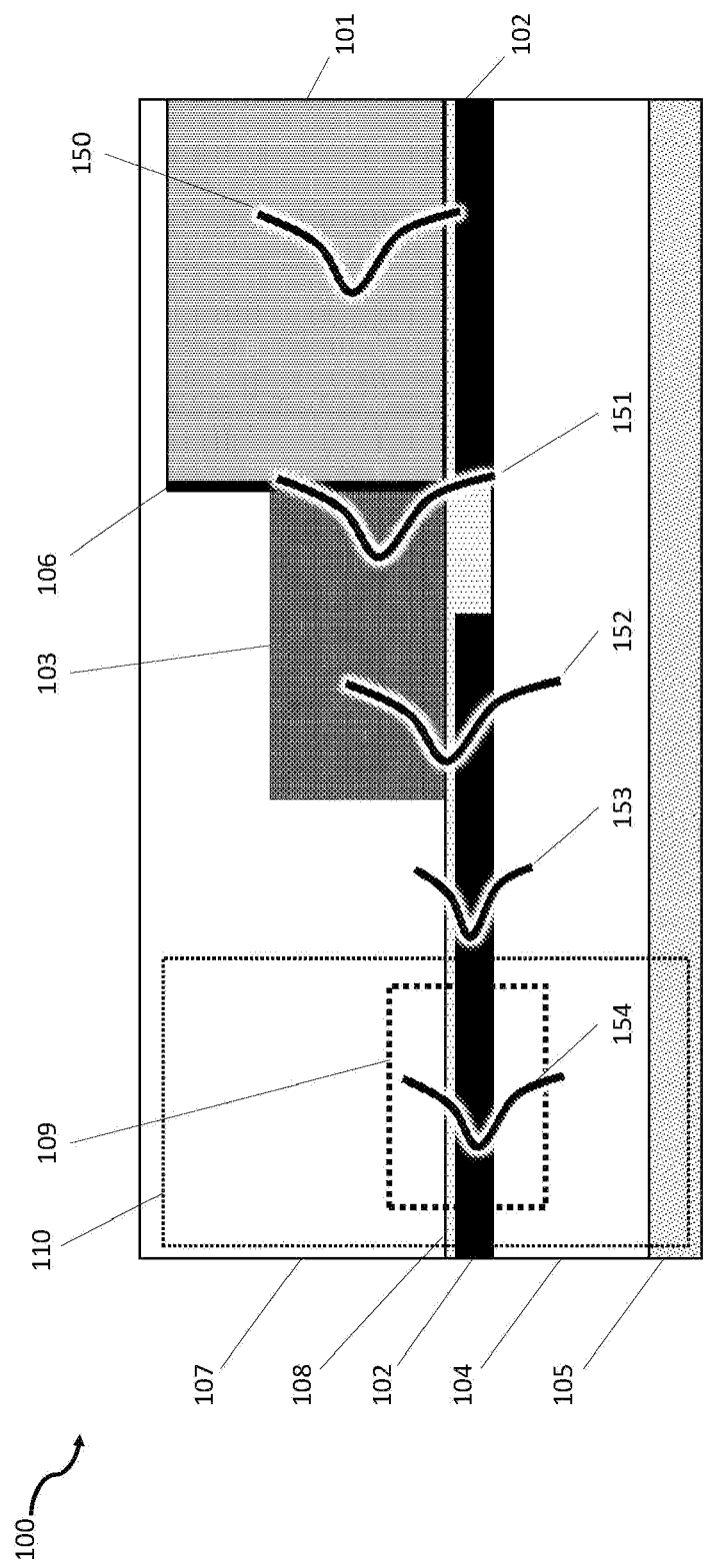
FIG. 1 illustrates a device according to one embodiment of the present invention, shown in cross section.

FIG. 1 is a schematic cross-section view of an integrated photonic device 100 utilizing butt-coupling and mode conversion for efficient coupling between dissimilar materials and utilizing rare-atom doping to provide optical amplification where rare-atoms are pumped by on-chip electrically pumped optical source. The exemplary cross-section includes a substrate 105 that can be any suitable substrate for semiconductor and dielectric processing, such as Si, InP, GaAs, quartz, sapphire, glass, GaN, silicon-on-insulator or other materials known in the art. In the shown embodiment, a layer 104 of a second material is deposited, grown, transferred, bonded or otherwise attached to the top surface of substrate 105 using techniques known in the field. The main purpose of layer 104 is to provide an optical cladding for layer 102 (to be described below), if necessary to form an optical waveguide with 102 as the core. Optical waveguides are commonly realized by placing a higher refractive index core between two lower refractive index layers to confine the optical wave. In some embodiments, layer 104 is omitted and substrate 105 itself serves as a cladding. Parts of layer 104 might be appropriately modified as will be described later with the help of region 109 and variations of the region 110 as described with the help of FIG. 2.

Layer 102 is deposited, grown, transferred, bonded or otherwise attached to the top of layer 104 if present, and/or to the top of substrate 105, using techniques known in the field. The refractive index of layer 102 is higher than the refractive index of layer 104 if present, or, if layer 104 is not present, the refractive index of layer 102 is higher than the refractive index of substrate 105. In one embodiment, the material of layer 102 may include, but is not limited to, one or more of SiN, $SiNO_x$, $TiO_2$, $Ta_2O_5$, (doped) $SiO_2$, $LiNbO_3$ and AlN. In some embodiments, other common dielectric materials may be used for layer 102. In other embodiments, a semiconductor material may be used for layer 102. In some embodiments, the refractive index of layer 102 is between 1.44 and 2.5. Either or both of layers 104 and 102 can be patterned, etched, or redeposited as is common in the art. Layer 102 is the core for the passive waveguide structure of what is termed the second element in the claims of this disclosure. Parts of layer 102 might be appropriately modified as will be described later with the help of region 109 and variations of the region 110 as described with the help of FIG. 2.

Layer 108, whose refractive index is lower than the refractive index of layer 102, overlies layer 102 and underlies layers 101 and 103 (to be described in more detail below), serving to planarize the top surface of layer 102. In some embodiments, the planarity of the top surface of layer 108 is provided by chemical mechanical polishing (CMP) or other etching, chemical and/or mechanical polishing methods. In other embodiments, the planarity is provided because of the intrinsic nature of the method by which layer 108 is deposited, for example if the material of layer 108 is a spin-on glass, polymer, photoresist or other suitable material. The planarization may be controlled to leave a layer of desired, typically very low, thickness on top of the layer 102 (as shown in FIG. 1), or to remove all material above the level of the top surface of the layer 102 (not shown). In cases where layer 108 is left on top of layer 102, its target thickness is in the range of 10 nm to several hundreds of nm. Due to typical (common in the art) non-uniformity of the planarization process (e.g. CMP), actual thickness can vary by more than +−100 nm from the target thickness across the wafer. In some embodiments, spin-on material is used to planarize and is then etched back resulting with improved across wafer uniformity compared to typical CMP processes. Parts of layer 108 might be appropriately modified as will be described later with the help of region 109 and variations of the region 110 as described with the help of FIG. 2.

Layer 101 is bonded on top of the whole or part of the corresponding (108, 102) top surface. Layer 101 comprises the core of the active waveguide structure of what is termed the first element in the claims of this disclosure.

The bonding can be direct molecular bonding or can use additional materials to facilitate bonding such as e.g., metal layers or polymer films as is known in the art. Layer 101 forms what is commonly called an active region, and it may itself be made up of one or more materials including, but not limited to, GaAs and GaAs based ternary and quaternary materials, InP and InP based ternary and quaternary materials, GaN and GaN based ternary and quaternary materials, or any other material suitable for providing direct optical emission. Layer 101 in some embodiment is multilayered (not shown), comprising sublayers, which together provide both optical and electrical confinement as well as electrical contacts, as is known in the art for active devices. In yet another embodiment, layer 101 uses lower layers 102, 108, 104 and/or 105 to provide electrical and/or optical confinement and one or more electrical contacts. Sublayers of layer 101 in some embodiments provide vertical confinement (up/down in FIG. 1), while lateral confinement (surface normal to the FIG. 1 cut) is provided by at least one etch as is known in the art for active device fabrication.

In some embodiments, layer 101 can be efficiently electrically pumped to generate optical emission and gain. The present invention enables efficient optical coupling between waveguides formed in layer 101 and layer 102, where in at least part of layer 102 the optical mode 154 interacts with region 109 as will be described below.

All the layers interacting with modes 153 and 154 are characterized by wide transparency, providing low-propagation loss in at least two distinct optical bands characterized by pump wavelength (defined by direct emission of layer 101, and used to pump rare-earth elements in region 109 as will be described) and signal wavelength (characterized by gain provided by rare-earth elements in region 109). In some embodiments, the pump wavelength would be 980 nm for e.g. Er-doped region 109, while signal would be around 1.55 μm where Er-doped region provides high quality gain as described above. Pairs of pump and signal wavelengths depend on rare-earth dopant and particular application, so any rare-earth element can be used including, but not limited to, ytterbium, neodymium, erbium, thulium, praseodymium, samarium, europium, and holmium.

Efficient coupling between layers 101 and 102 is facilitated by layer 103, and, in cases where layer 106 is present, by layer 106. Layer 103 is the core of the intermediate waveguide structure of what is termed the intermediate element in the claims of this disclosure.

Optional layer 106 primarily serves as either an antireflective or a highly reflective coating at the interface between layer 101 and layer 103. Layer 103 serves as an intermediate waveguide layer that in some embodiments accepts the profile (depicted by line 150) of an optical mode supported by the waveguide for which layer 101 provides the core, captures it efficiently as mode profile 151, and gradually transfers it to mode profiles 152, and finally 153. Mode profile 153 is efficiency coupled to the waveguide for which layer 102 provides the core. Mode profile 153 is then efficiently converted to mode profile 154 in which overlap between the optical mode 154 and region 109 is optimized as will be described below. Such conversion and optimization can be facilitated by controlling the dimensions of the waveguide such as e.g. width as will be described with the help of FIG. 3. In other embodiments thickness of layer 102 can be modified (not shown) and/or partial etches (not shown) can be introduced. In some embodiments modes 153 and 154 are essentially identical.

The refractive index of layer 103 can be engineered to facilitate efficient coupling of mode profile 150 and to efficiently transform the mode to one with mode profile 153 by taking advantage of tapered structures made in layer 102 and/or 103. In some embodiments the refractive index of layer 103 is between 1.5 and 2. The thickness of layer 103 is an optimization parameter, and in some embodiments, it is between 400 nm and 2000 nm. In the absence of intermediate layer 103, the requirements on taper tip width to facilitate efficient coupling as will be described with the help of FIG. 3 would be problematic. The use of intermediate layer 103, however, significantly reduces the stringent requirements on taper tip width, allowing efficient transfer between very high refractive index materials (such as e.g., GaAs in layer 101) to low refractive index materials (such as e.g., SiN in layer 102).

Differences between the optical modes supported by waveguides in layers 101 and 102 respectively may or may not be obvious by observation of the mode profiles, but mode overlaps less than 100% and vertical offset (in FIG. 1) between modes 150 and 153 could (in the absence of intermediate layer 103) result in significant optical loss. In some cases, it may be considered that losses of up to 1 dB are acceptable, but losses greater than that are not. In other cases, a 3 dB loss level may be the criterion chosen. The function of layer 103 is to keep optical loss due to imperfect mode overlap below whatever is determined to be an acceptable level in a given application.

The upper cladding layer 107 for waveguides realized in 103 and/or 102 can be ambient air (meaning no cladding material is actually deposited) or can be any other deliberately deposited suitable material as shown in FIG. 1, including, but not limited to, a polymer, SiO2, SiNx, SiNOx etc. In some embodiments same material is used for layer 107 and layer 108. In some embodiments (not shown), layer 107 cladding functionality can be provided with multiple depositions, e.g. one material provides the cladding for mode 153 guided by core formed in layer 102, and another material provides the cladding for mode 151 guided by core formed in layer 103. In all cases, the refractive index of cladding material is lower than the refractive index of the material which provides the core for the mode guiding. In yet another embodiment (not shown), layer 103 can provide cladding functionality to layer 102 and modes 153 and 154, owning to its refractive index being lower by design.

Parts of layer 107 might be appropriately modified as will be described later with the help of region 109 and variations of the region 110 as described with the help of FIG. 2.

Region 109 is a region in which rare-earth elements are present and can interact with the optical mode 154. Optical mode 154 at the pump wavelength excites the rare-earth elements enabling them to provide gain and emission at the signal wavelength dependent on the exact rare-earth element utilized. Waveguide realized in 102 can efficiently support the signal wavelength, although mode shape (not shown) is generally different than the shape of the optical mode 154 at pump wavelength. Rare-earth elements can be introduced in multiple ways, as will be described in additional details with the help of FIG. 2. In some cases, they are deposited via atomic layer deposition as at least one of the bottom cladding 104, waveguide 102, planarization layer 108 and top cladding 107 are deposited. In other embodiments rare-earth elements are introduced to at least one of the bottom cladding 104, waveguide 102, planarization layer 108 and top cladding 107 via indiffusion, ion implantation, sputtering, chemical vapor deposition, melting, pulsed laser deposition, spin-coating and/or other methods including etching to open pockets for optimization of the overlap between dopants and optical model 154. In all cases rare-earth elements can be introduced in at least one of the bottom cladding 104, waveguide 102, planarization layer 108 and top cladding 107.

One or more lithography alignment marks (not shown in this cross-sectional view, but see, for example, 340 in FIG. 3 and described below) are present to facilitate precise alignment between the layers formed during various processing steps.

In some embodiments, layer 108 is not present and both layer 101 is bonded and layer 103 is deposited on top of a non-planar layer 102. In such embodiments, there is no planarization step.

Figure 2:
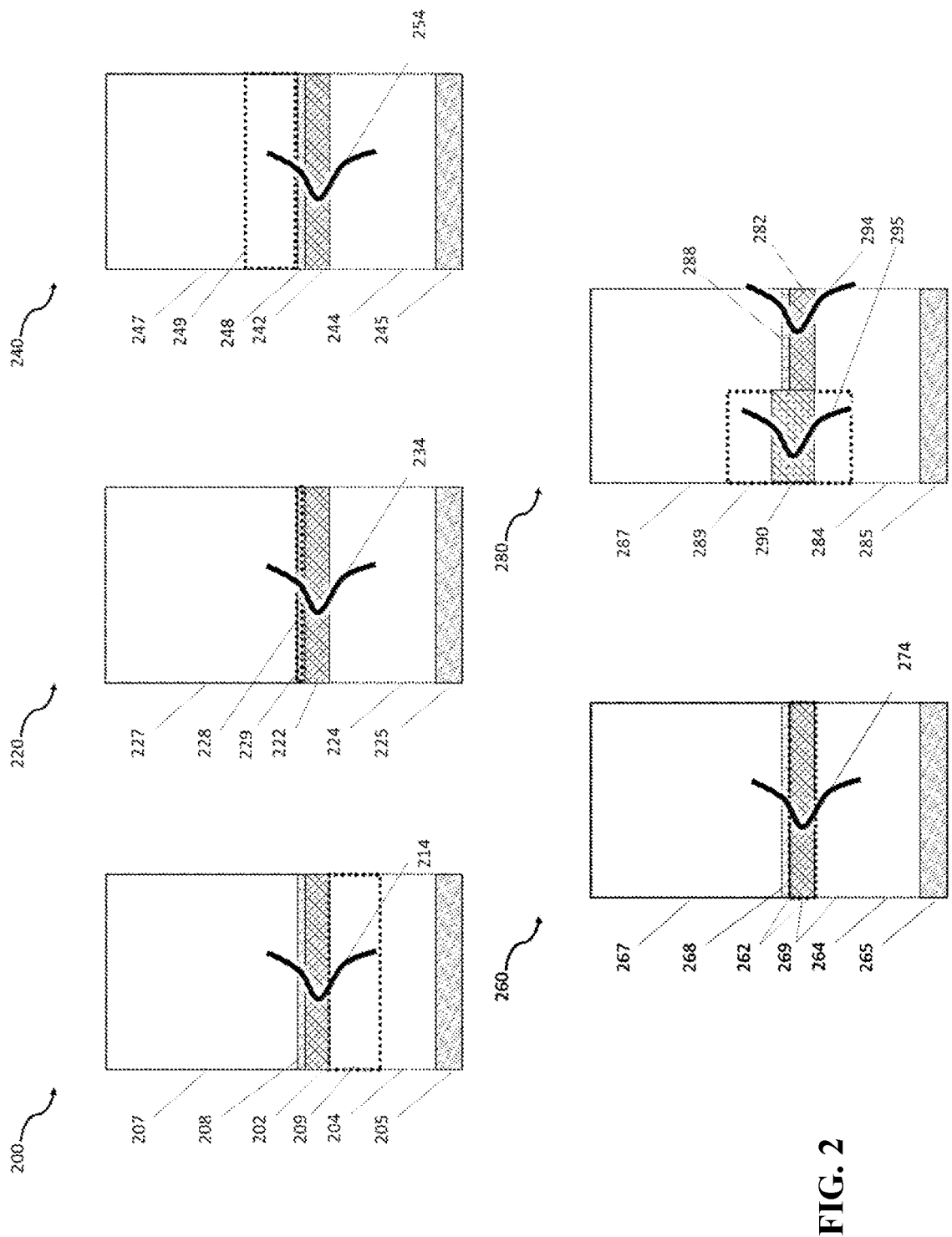
FIG. 2 shows a cross-sectional end-on views of five devices according to some embodiments of the present invention.

FIG. 2 depicts additional five embodiments of the present invention shown in cross-sectional end-on views 200, 220, 240, 260 and 280 in the region where doped rare-earth elements are incorporated and interaction between pump and signal wavelength is optimized.

Functional layers 202 to 208 in view 200 (unless explicitly defined differently) correspond to functional layers 102 to 108 as described in relation to FIG. 1. Similarly functional layer correspondence holds for other views (220, 240, 260 and 280) where the numbering is increased by 20 for each view.

In view 200, layer 202 provides the core functionality for the waveguide structure supporting mode 214 that optically interacts with region 209 that occupies at least part of the layer 204 providing bottom cladding functionality. Region 209 comprises rare-earth elements that can be efficiently pumped by mode propagating through waveguide formed by layer 202 as core, and also can provide gain to another mode (at different frequency) propagating through the same layer.

In view 220, layer 222 provides the core functionality for the waveguide structure supporting mode 234 that optically interacts with region 229 that occupies at least part of the layer 228 providing planarization functionality. Region 229 comprises rare-earth elements that can be efficiently pumped by mode propagating through waveguide formed by layer 222 as core, and also can provide gain to another mode (at different frequency) propagating through the same layer.

In view 240, layer 242 provides the core functionality for the waveguide structure supporting mode 254 that optically interacts with region 249 that occupies at least part of the layer 247 providing planarization functionality. Region 249 comprises rare-earth elements that can be efficiently pumped by mode propagating through waveguide formed by layer 242 as core, and also can provide gain to another mode (at different frequency) propagating through the same layer.

In view 260, layer 262 provides the core functionality for the waveguide structure supporting mode 274 that optically interacts with region 269 that occupies at least part of the layer 262 providing planarization functionality. Region 269 comprises rare-earth elements that can be efficiently pumped by mode propagating through waveguide formed by layer 262 as core, and also can provide gain to another mode (at different frequency) propagating through the same layer.

In view 280, layer 282 provides the core functionality for the waveguide structure supporting mode 294 that is efficiently coupled to layer 290 that provides the core functionality to mode 295 that optically interacts with region 289 that occupies at least part of the layer 290 and, in some embodiments, parts of the cladding for the mode 295. Region 289 comprises rare-earth elements that can be efficiently pumped by mode propagating through waveguide formed by layer 290 as core, and also can provide gain to another mode (at different frequency) propagating through the same layer. Layer 290 is realized by removing parts of layer 282 and then depositing additional materials suitable for rare-earth element doping. Some examples of suitable materials include, but are not limited to, $Al_2O_3$, $Y_2O_3$, AlGaAs, doped $SiO_2$, other types of glass.

FIG. 3 depicts a top-down view of an integrated photonic device 300, according to one embodiment of the present invention, zoomed into a transition area, where boundaries between dissimilar materials are angled to control both the transmission and back reflection. Functional layers 301 to 307 (unless explicitly defined differently) correspond to functional layers 101 to 107 as described in relation to FIG. 1.

The optical mode 350 supported by active layer 301 (defined by at least one lateral etch, not shown) is guided, through optional coating layer 306 if present, into layer 303, which supports optical mode 352 and serves to convert the mode for efficient coupling to layer 302, which supports mode 353. Layer 302 dimensions are optimized, as suggested by changing the width in this view to 302a around regions 309a and 309b comprising rare-earth atoms, to facilitate more efficient mode overlap between mode 354 and regions 309a and 309b. In other embodiments thickness of layer 102 can be modified (not shown) and/or partial etches (not shown) can be introduced. In some embodiments, the dimensions are optimized such to expand the mode size with intent of increasing the overlap with dopants. Additional modifications of waveguide dimensions (not shown) can be utilized to optimize the performance including e.g. optimized bending to control the losses at different wavelengths, and/or various taper and filter structures. In some embodiments modes 153 and 154 are essentially identical. Layer 306 can provide high reflection functionality or, alternately, can facilitate reduced reflection when designed to function as an anti-reflection coating. To facilitate coupling between modes supported by layers 301 and 302, the dimensions of layer 302 are tapered down towards layer 301, as indicated by the relatively small width of the tip 311 relative to the width of layer 302 shown at the extreme left of the figure. It has been calculated that the requirements on taper dimensions are significantly relaxed up to several hundred nanometers due to the presence of layer 303. For example, a coupling efficiency between 301 and 302 of 70% or greater may be achieved, even if the refractive index difference between 301 and 302 is larger than one, for a tip width greater than one hundred nanometers. In contrast, in the absence of layer 303, layer 301 would have to be tapered such that its mode may directly couple into layer 302, and the dimensions of the taper tip of layer 301 (not shown) would have to be much less than one hundred nanometers for a similar coupling efficiency. In another embodiment, a taper is created in layer 303 instead of in layer 302 (not shown). In yet another embodiment, tapers may be created in both layers 302 and 303 for highly efficient coupling. In some embodiments, said tapers in layers 302 and 303 can be multistage tapers meaning they utilize more than one etch depth to facilitate more efficient coupling.

Additionally, in some embodiments, one or more of the interfaces between layers 301, 306 and/or 303 are angled to reduce corresponding back reflection(s).

The angle 320 is the angle between the tangent of the direction of propagation of the wave inside structure 301 and the exit facet of 301 (its interface meeting 306 and/or 303 if layer 306 is not present). Angle 320 is primarily utilized to control the back reflection of the mode supported by layer 301 when it reaches the interface meeting 306 and/or 303, and its precise value is a result of numerical or experimental optimization. In some embodiments it ranges from 0° to 80°.

The angle 330 is the angle between the direction of the propagation of the wave inside the structure 301 and the angle of the waveguide formed by 303. Said angle is an optimization parameter for coupling efficiency between the modes supported by layer 301 and 303 and is related to the choice of the angle 320 and/or the refractive indices of used materials in layers 301 and 303 and their respective claddings. In some embodiments it ranges from 0° to 80°.

The precise vertical alignment (up/down in FIG. 3) between the axis defined by the direction of the propagation of the wave inside the structure 301 and the center of the waveguide 303 at the interface to 306 and/or 301 is an optimization parameter where such offset can be positive (up in FIG. 2), negative (down in FIG. 2) and/or substantially equal to 0 (no offset). Such optimization is straightforward to perform with numerical software to maximize the performance of the transition together with optimizing the angle 330.

In the absence of intermediate layer 103/303, the requirements on taper tip width for direct transfer between layer 101/301 and 102/302 would be problematic. The use of intermediate layer 103/303 that is butt-coupled, albeit with angled interface in some embodiments, to layer 101/301, however, significantly reduces the stringent requirements on taper tip widths, allowing efficient transfer between very high refractive index materials (such as e.g. GaAs and/or InP based layers in 101/301) to low refractive index materials (such as e.g. SiN, LiNbO3 or similar in layer 102/302). Layer 303 may comprise a dielectric, a polymer, and/or any other suitable material. No adiabatic transformation occurs between the optical modes supported by elements 101/301 and 103/303 at the butt-coupled interface. Layer 103/303 and/or layer 102/302 can comprise bends to control the routing of the guided optical waves.

Once mode is efficiently coupled to waveguide for which layer 302 provides the core, it can be routed, filtered and shaped such to facilitate efficient interaction with rare-earth dopants in regions 309a and 309b. In embodiment shown in FIG. 3, regions 309a and 309b are laterally offset from the waveguide 302. In some embodiments they are directly overlaying waveguide 302 (resulting with single doped region). In other embodiments, dopants are only at certain layers (heights, corresponding to out of image plane in FIG. 3) as described with the help of FIGS. 1 and 2.

One or more lithography alignment marks 340 are present to facilitate precise alignment between the layers formed during various processing steps.

Figure 4:
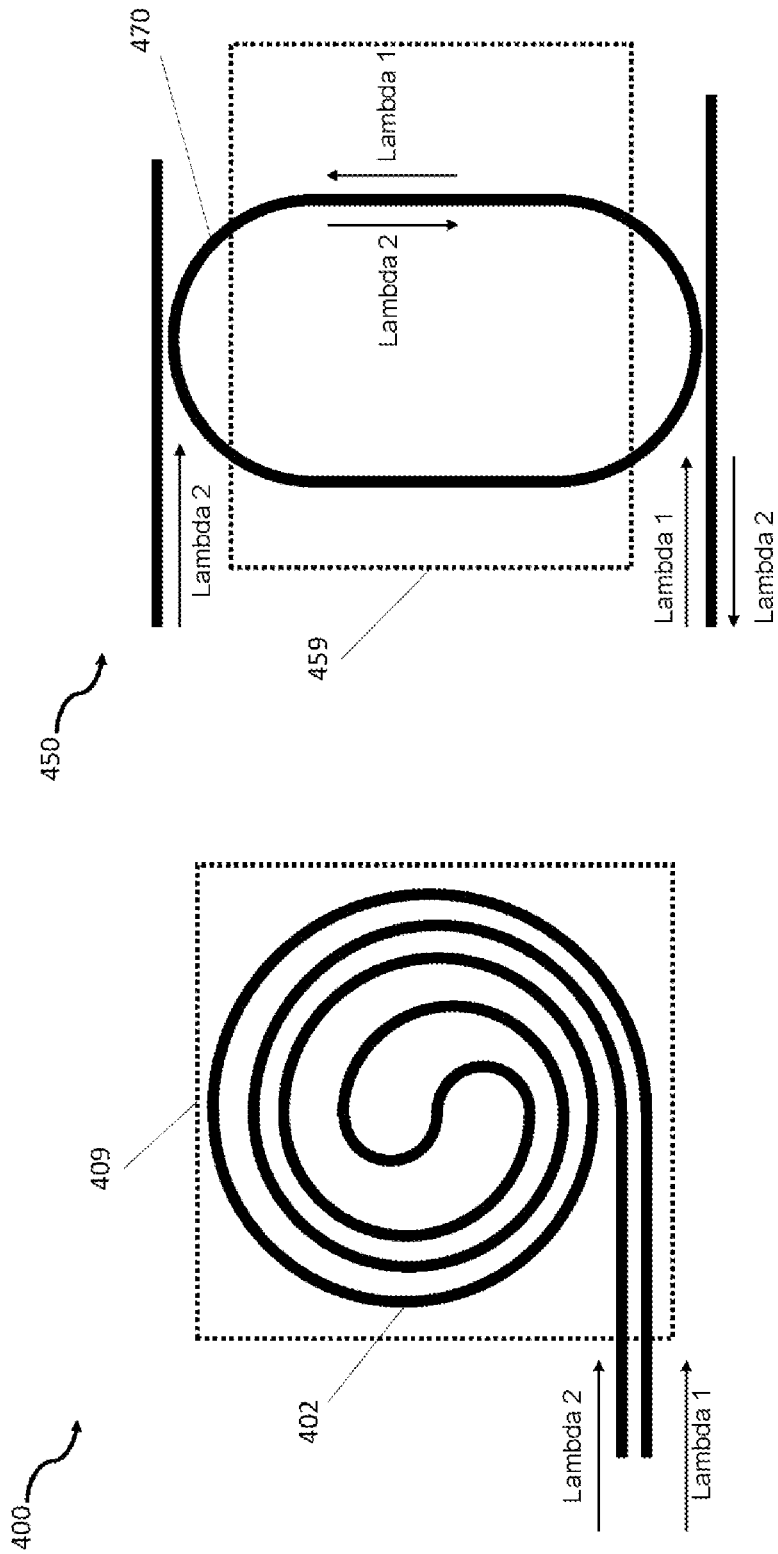
FIG. 4 shows a cross-sectional top-down views of two devices according to some embodiments of the present invention.

FIG. 4 depicts two embodiments of the present invention shown in top-down views 400 and 450 in the region where interaction between the optical modes and dopants is optimized. In these embodiments, the interaction length between the optical pump signal and the region comprising rare-earth dopants is increased resulting in more efficient pumping and higher performance as will be described below.

In the embodiment shown in view 400, the interaction length is increased by designing a longer waveguide structure 402, typically laid out in a spiral fashion. The waveguide structure 402 and the doped region 409, in the region(s) optimized for pumping efficiency, can be designed to make use of various waveguide geometry optimizations as described with the help of FIGS. 1-3. In some embodiments, waveguide crossings are to be avoided and a double spiral as sketched in view 400 is utilized. The pump (Lambda 1) and signal (Lambda 2) can counter-propagate as shown in view 400, can co-propagate (not shown), or pump can be injected in both directions so that one part of total pump energy is co-propagating with the signal and one part of the total pump energy is counter-propagating (not shown). This can be achieved by appropriately splitting output from a single pump or utilizing more than one pump. In other embodiments (not shown) crossings can be used to increase density (total length vs total area) of the structure. In yet other embodiments, other geometries, most suitable for manufacturing, are designed.

In the embodiment shown in view 450, resonant structures such as e.g. ring resonators, racetrack resonators or similar, are used to increase the interaction between the pump and frequency converted signal using the effective cavity length of the resonator and/or power buildup inside the resonator. Various resonator configurations can be utilized such as e.g., an add-drop resonator 470 (as shown in view 450), an all-pass resonator (not shown), multiple coupling regions with a single ring (more than two), and/or multiple rings (with one or more coupling points) designs, with a goal of optimizing the performance in terms of pump efficiency and gain. The waveguide structure of resonator 470 in the regions optimized for pumping efficiency, can be designed to make use of various waveguide geometry optimizations as described with the help of FIGS. 1-3. Similarly to the case of embodiments shown in view 400, in the case of embodiment shown in view 450 various configurations of pump (Lambda 1) and signal (Lambda 2) arrangements can be utilized. In one embodiment, the wavelengths Lambda 1 and Lambda 2 are counter-propagation (a shown in 450). In other embodiments they can co-propagate, or pump can both counter- and co-propagate with the signal. Additionally, coupling ratios for the resonator can be designed in such way that most of the pump power is coupled with the resonator at one structure, while most of the signal power is coupled with the resonator at the other structures. The optimization of the coupling structure can facilitate higher efficiency and/or can be used to send majority of signal to a particular waveguide.

Figure 5:
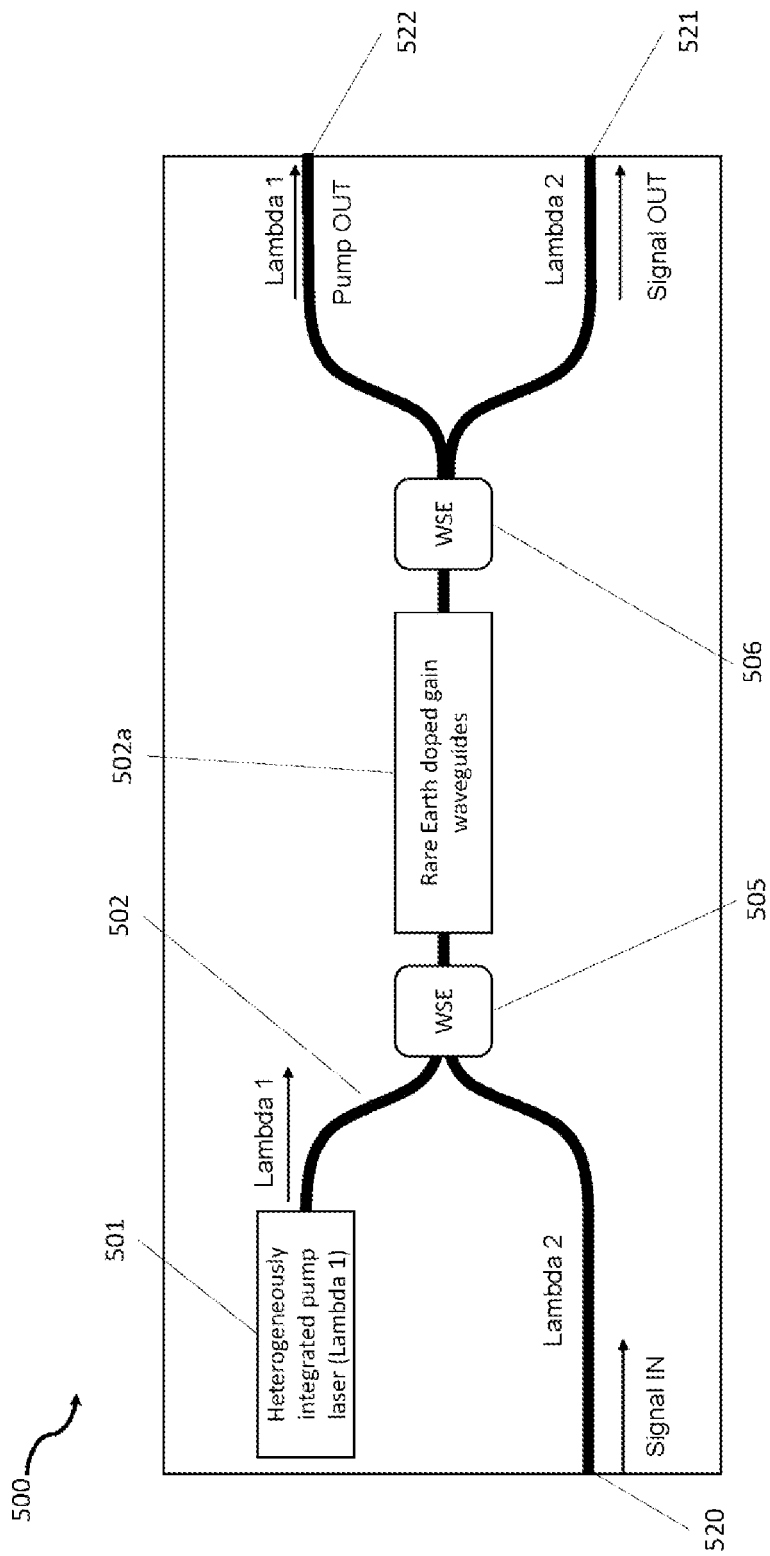
FIG. 5 shows a cross-sectional top-down views of a photonic integrated circuit according to some embodiments of the present invention.

FIG. 5 shows an embodiment of a photonic integrated circuit (PIC) based doped waveguide amplifier (DWA) 500 utilizing the present invention. The PIC 500 comprises a heterogeneously integrated pump laser 501 (that is efficiently coupled to waveguide 502 and electrically pumped as described with the help of FIG. 1) having optical output at one wavelength (Lambda 1) suitable for pumping the rare-earth elements suitably deposited in the rare-earth doped gain waveguides 502a. The PIC has signal IN optical input 520 optimized for coupling signal wavelength (Lambda 2). Both the signal wavelength (Lambda 2) and the pump wavelength (Lambda 1) are coupled to a single waveguide using a wavelength selective element (WSE) 505. Various components can be used to provide the WSE functionality, including directional couplers (due to their coupling length being wavelength dependent), various filters (e.g. grating and/or resonator based), arrayed waveguide gratings (AWGs), echelle gratings, adiabatic couplers, multimode interference couplers and others as is known in the art. In the shown embodiment, the pump and signal are co-propagating through the waveguide 502a before being separated using a second WSE 506. The second WSE splits the output from waveguide 502a in frequency, so most of the pump (Lambda 1) is going towards output 522 (Pump OUT), while most of the signal (Lambda 2) is going towards output 521 (Signal OUT). At least two optical interfaces 520 and 521 are coupled to a fiber. Waveguides 502 and 502a support both wavelengths (Lambda 1 and Lambda 2) and provide sufficiently low losses so the device from port 520 to 521 provides a net gain to the optical signal. In some embodiments, said gain is larger than dB. In other embodiments it is larger than 10 dB. In embodiments where rare-earth element is erbium, Lambda 1 wavelength is either around 980 nm or around 1450 nm, and Lambda 2 is occupying wavelength range around 1550 nm. In some embodiments where rare-earth element is neodymium, Lambda 1 wavelength could be around 808 nm, 869 nm and 1064 nm or some other suitable wavelength. In some embodiments where rare-earth element is ytterbium, Lambda 1 wavelength could be around 910 nm and 975 nm or some other suitable wavelength. In case other rare-earth elements are utilized, pump and signal wavelengths are accordingly optimized. In other embodiments, pump and signal wavelengths are counter-propagating (not shown), or both co-propagating and counter-propagating as explain above. In yet other embodiments, there is no output 522 for the pump OUT, and this waveguide is either terminated or a reflector is utilized to recycle the remaining part of the pump signal. A reflector can be highly reflective grating, loop-mirror or any other suitable component provided high reflection functionality at the pump signal wavelength.

Figure 6:
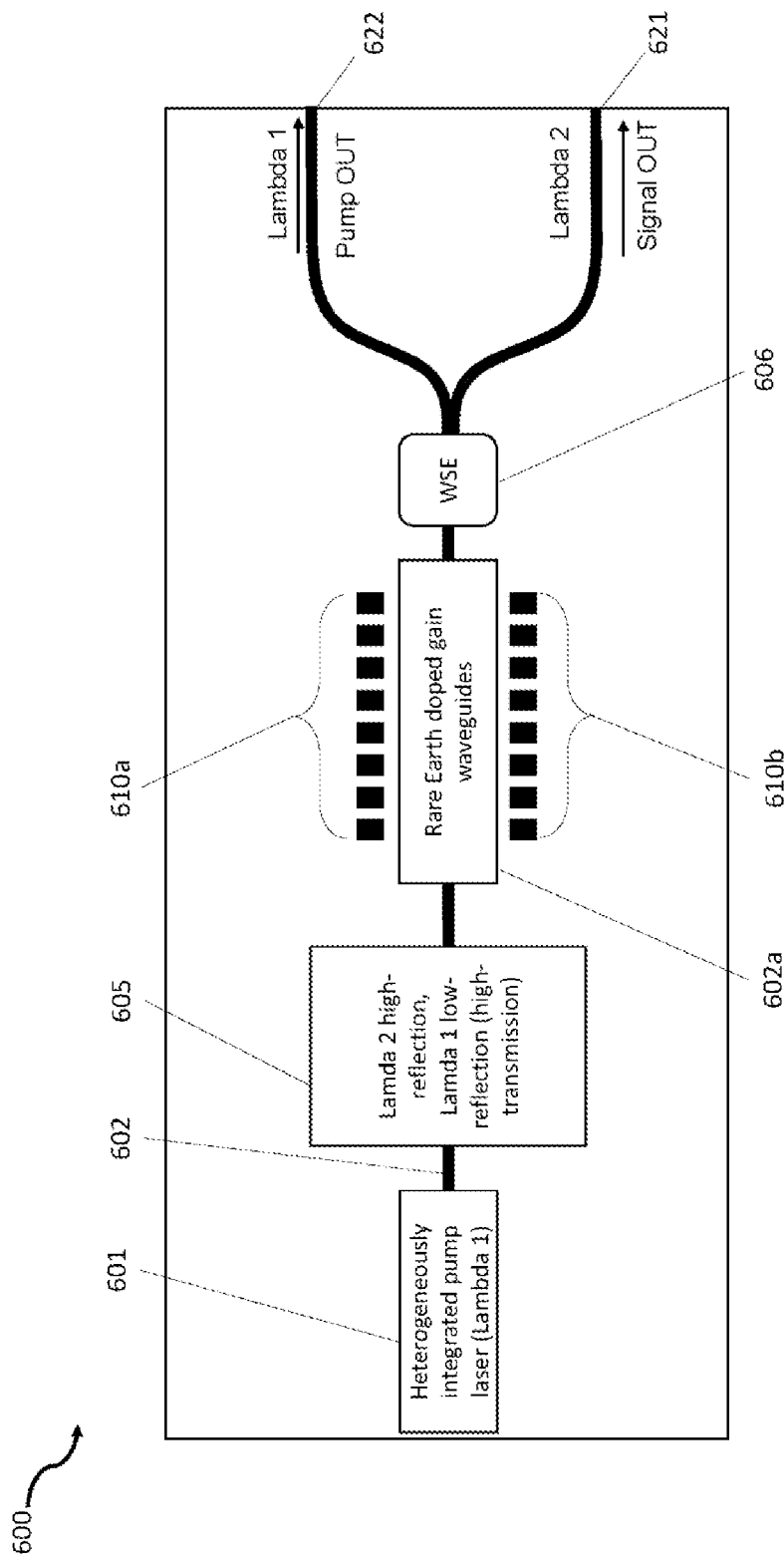
FIG. 6 shows a cross-sectional top-down views of a photonic integrated circuit according to some embodiments of the present invention.

FIG. 6 shows an embodiment of a photonic integrated circuit (PIC) based doped waveguide amplifier (DWA) 600 utilizing the present invention to realize a distributed feedback (DFB) laser. The PIC 600 comprises a heterogeneously integrated pump laser 601 (that is efficiently coupled to waveguide 602 and electrically pumped as described with the help of FIG. 1) having optical output at one wavelength (Lambda 1) suitable for pumping the rare-earth elements suitably deposited in the rare-earth doped gain waveguides 602a. The output of pump laser 601 goes through an element 605 providing low-reflection (high-transmission) for Lambda 1 wavelength, while at the same time providing high-reflection for Lambda 2 wavelength. Element 605 is optional, but in general serves to increase the performance of the PIC. This element can also be used to prevent unwanted back reflection of the signal (Lambda 2) back towards the pump laser 601 that could destabilize the pump (especially when the wavelength difference between the pump (Lambda 1) and the signal (Lambda 2) is not very large). Various components can be used to provide the element 605 functionality, including gratings, resonators, directional coupler assisted loop-mirrors and others as is known in the art. In the shown embodiment, the pump is coupled to rare-earth doped gain waveguides 602a which is efficiently pumped to provide gain in a different wavelength region (Lambda 2). With sufficient pumping, the net gain of the waveguide 602a at Lambda 2 becomes greater than 1, and supports stimulated emission of the spontaneously emitted photons that are suitable reflected using a distributed feedback mirror 610a and 610b as is known in the design of the DFB lasers. Various designs of the distributed feedback mirrors can be utilized including symmetric, single side, double side posts (as illustrated in view 600) and others, with a goal of providing frequency selective feedback to support the lasing operation at signal wavelength (Lambda 2).

The WSE 606 splits the output from waveguide 602a in frequency, so most of the pump (Lambda 1) is going towards output 622 (Pump OUT), while most of the signal (Lambda 2) is going towards output 621 (Signal OUT). In some embodiments (not shown), there is no output 622 for the pump OUT, and this waveguide is either terminated or a reflector is utilized to recycle the remaining part of the pump signal. In yet other embodiments (not shown), the WSE 606 is replaced with an element that is similar to element 605 but provides high reflection for the pump wavelength (Lambda 1) while providing low reflection for signal wavelength (Lambda 2). This enables additional recycling of the pump signal while enabling efficient transmission of the signal to the output 621.

Waveguides 602 and 602a support both wavelengths (Lambda 1 and Lambda 2) and provide sufficiently low losses so that the output from the device from port 621 provides a high-performance DFB laser at signal wavelength. In embodiments where rare-earth element is erbium, Lambda 1 wavelength is either around 980 nm or around 1450 nm, and Lambda 2 is occupying wavelength range around 1550 nm. In case other rare-earth elements are utilized, pump and signal wavelengths are accordingly optimized.

Figure 7:
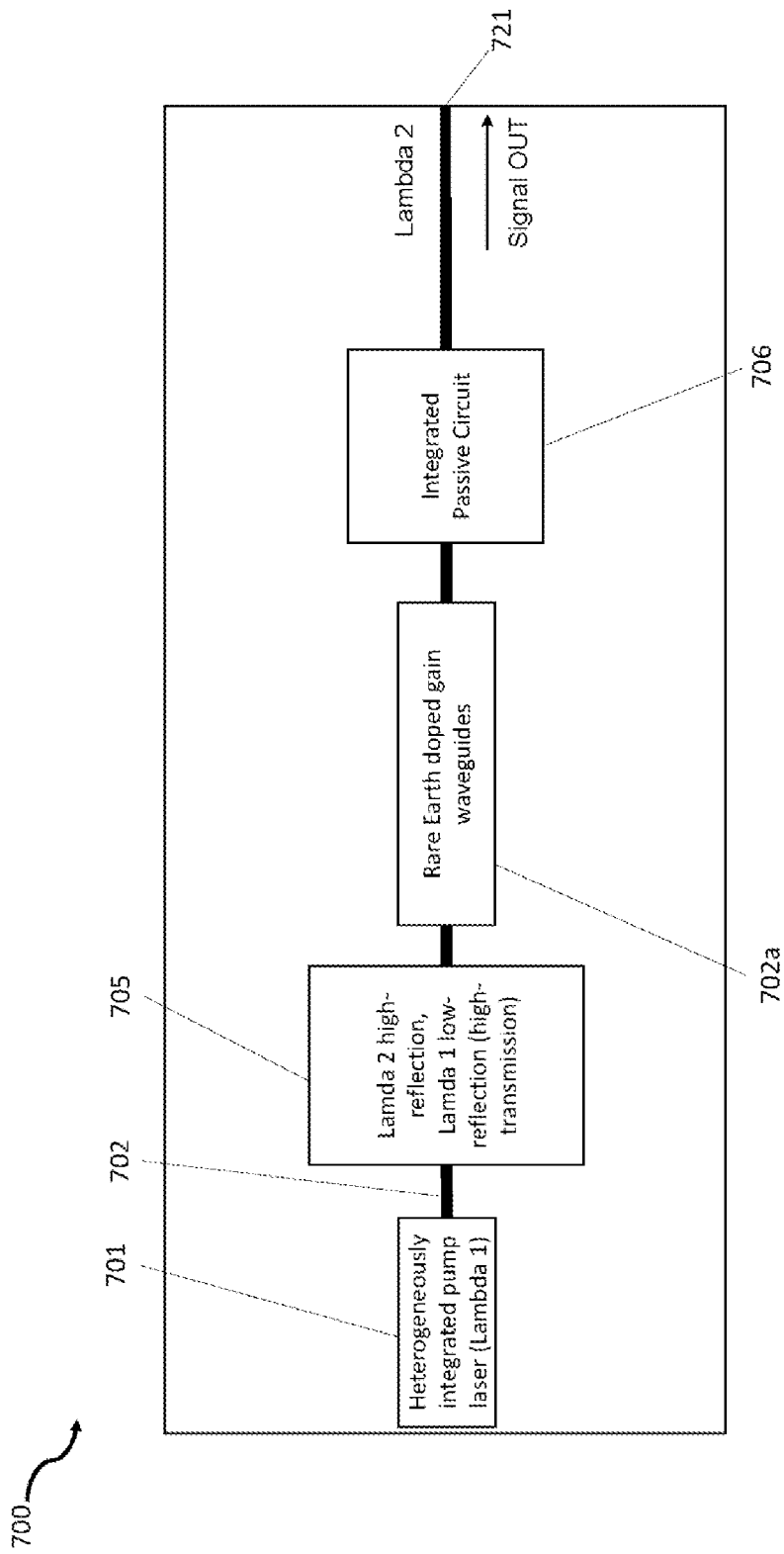
FIG. 7 shows a cross-sectional top-down views of a photonic integrated circuit according to some embodiments of the present invention.

FIG. 7 shows an embodiment of a photonic integrated circuit (PIC) based doped waveguide amplifier (DWA) 700 utilizing the present invention to realize an external cavity laser. The PIC 700 comprises a heterogeneously integrated pump laser 701 (that is efficiently coupled to waveguide 702 and electrically pumped as described with the help of FIG. 1) having optical output at one wavelength (Lambda 1) suitable for pumping the rare-earth elements suitably deposited in the rare-earth doped gain waveguides 702a. The output of pump laser 701 goes through an element 705 providing low-reflection (high-transmission) for Lambda 1 wavelength, while at the same time providing high-reflection for Lambda 2 wavelength. Element 705 is optional, but in general serves to increase the performance of the PIC. Various components can be used to provide the element 705 functionality, including gratings, resonators, directional coupler assisted loop-mirrors and others as is known in the art. In the shown embodiment, the pump is coupled to rare-earth doped gain waveguides 702a which is efficiently pumped to provide gain in a different wavelength region (Lambda 2). With sufficient pumping, the net gain of the waveguide 702a at Lambda 2 becomes greater than 1 and supports stimulated emission of the spontaneously emitted photons that are suitable reflected using the passive integrated circuit 706. Passive integrated circuit 706 comprises one or more ring resonators used to filter out a single longitudinal mode of the laser operating at wavelength Lambda 2. In some embodiments two or more ring resonators designed to use Vernier effect are utilized. Ring resonators, in some embodiments, have tuning element allowing to control the output wavelength of the laser utilizing gain of the waveguides 702*a* for stimulated emission. Integrated passive circuit 706 can also comprise a WSE (not shown) that splits the output from waveguide 702*a* in frequency, so most of the signal (Lambda 2) is going towards output 721 (Signal OUT), while most of the pump (Lambda 1) is going towards second output (not shown). In other embodiments, this second output is either terminated or a reflector is utilized to recycle the remaining part of the pump signal.

Waveguides 702 and 702*a* support both wavelengths (Lambda 1 and Lambda 2) and provide sufficiently low losses so that the output from the device from port 721 provides a high-performance external cavity laser at signal wavelength. In embodiments where rare-earth element is erbium, Lambda 1 wavelength is either around 980 nm or around 1450 nm, and Lambda 2 is occupying wavelength range around 1550 nm. In case other rare-earth elements are utilized, pump and signal wavelengths are accordingly optimized.

It is to be understood that these illustrative embodiments teach just some examples of PIC utilizing the present invention, and many other similar arrangements can be envisioned. Furthermore, such PICs can be combined with multiple other components to provide additional functionality or better performance such as various filtering elements, amplifiers, monitor photodiodes, modulators and/or other photonic components.

Embodiments of the present invention offer many benefits. The integration platform enables scalable manufacturing of PICs made from multiple materials providing higher-performance and/or ability to operate in wavelengths needed for both the pump and signal to propagate. Furthermore, the platform is capable of handling high optical power compared to typical Si waveguide-based or InP waveguide-based PICs due to the use of high-bandgap materials for the waveguide.

Previous approaches have generally used taper structures in order to transfer an optical mode from an III/V semiconductor active device (101) to a passive device (102), where a width of compound semiconductor region is adiabatically tapered down to sub-micron size. However, a required width of the taper tip decreases rapidly to tens of nanometer sizes as the difference in refractive indices increases. The present invention deploys a butt coupling scheme to eliminate the need of a very small taper size in the compound semiconductor waveguide (101 in FIG. 1), which eases fabrication of such structures while also enabling optimization of the interaction between optical signals/modes and the rare-earth dopants.

Other approaches have relied on die attachment of prefabricated optical active devices to passive waveguides. This requires very stringent alignment accuracy, which is typically beyond what a typical die-bonder can provide. This aspect limits the throughput of this process as well as the performance of optical coupling.

This present invention utilizes a process flow consisting typically of wafer-bonding of a blanket piece of compound semiconductor material on a carrier wafer with dielectric waveguides (as is described with the help of FIG. 1) and subsequent semiconductor fabrication processes as is known in the art. It enables an accurate definition of optical alignment between active and passive waveguides via typically photo lithography step, removing the need for precise physical alignment. Said photo lithography-based alignment allows for scalable manufacturing using wafer scale techniques.

Efficient optical transfer between dissimilar materials is facilitated by using a butt-coupling approach in combination with a mode-converter (the intermediate waveguide) that removes the need for narrow taper tips that are challenging to resolve and fabricate with current state-of-the-art tools.

It is to be understood that optical coupling between modes in active and passive layers is reciprocal, so that, taking FIG. 1 as exemplary, the structure can be configured to facilitate light transmission from region 101 to region 102, but also to facilitate transmission in the reverse direction, from region 102 to region 101. In is to be understood that multiple such transitions with no limitation in their number or orientation can be realized on a suitably configured PIC.

In some embodiments the active device can utilize the substrate for more efficient thermal sinking, due to direct contact to the substrate with no dielectric in-between.

In some embodiments, the active device creates a hybrid waveguide structure with dielectric layers which can be used, for example, to create a wavelength selective component formed inside the laser cavity for e.g. distributed feedback (DFB) lasers or similar components.

Embodiments of the optical devices described herein may be incorporated into various other devices and systems including, but not limited to, various computing and/or consumer electronic devices/appliances, communication systems, sensors and sensing systems.

It is to be understood that the disclosure teaches just few examples of the illustrative embodiment and that many variations of the invention can easily be devised by those skilled in the art after reading this disclosure and that the scope of the present invention is to be determined by the following claims.

The invention claimed is:

1. A device comprising:
   first, second and third elements fabricated on a common substrate;
   wherein the first element comprises an active waveguide structure comprising electrically pumped optical source supporting a first optical mode, the second element comprises a passive waveguide structure supporting a second optical mode in at least part of the second element, and the third element, at least partly butt-coupled to the first element, comprises an intermediate waveguide structure supporting intermediate optical modes;
   wherein at least part of the second element supports at least one optical mode that interacts with rare-earth dopants;
   wherein a tapered waveguide structure in at least one of the second and third elements facilitates efficient adiabatic transformation between the second optical mode and at least one of the intermediate optical modes;
   wherein no adiabatic transformation occurs between any of the intermediate optical modes and the first optical mode; and
   wherein mutual alignments of the first, the second, and the third elements are defined using lithographic alignment marks that facilitate precise alignment between layers formed during processing steps of fabricating the first, the second, and the third elements.

2. The device of claim 1,
wherein the third element directly overlies a planarized top surface realized by planarization prior to third element deposition.

3. The device of claim 1,
wherein an interface between the first and the third elements is angled at an angle optimized to minimize reflections.

4. The device of claim 1,
wherein at least part of the second element has waveguide dimensions optimized for maximizing an interaction between dopants and at least one optical mode.

5. The device of claim 1,
wherein the dopants occupy at least part of a core of the second element in region where they interact with the optical mode.

6. The device of claim 1,
wherein the dopants occupy at least part of a cladding of the second element in region where they interact with the optical mode.

7. The device of claim 1,
where the part of the second element supporting at least one optical mode that interacts with rare-earth dopants comprises a resonant structure configured to enhance the efficiency of an optical pumping of the dopants.

8. The device of claim 1,
where the part of the second element supporting at least one optical mode that interacts with rare-earth dopants comprises a spiral-based delay structure configured to enhance the efficiency of the optical pumping of the dopants.

9. The device of claim 1,
Wherein first element optical source emits at a pump wavelength;
wherein the second element comprises additionally at least one wavelength selective element configured to combine the pump wavelength and a signal wavelength, at least one input port configured to support the signal wavelength and at least one output port configured to support the signal wavelength;
wherein the device is configured to receive an external signal from one of input ports, amplify the external signal using rare-earth dopants and direct an amplified external signal to at least one output port.

10. The device of claim 9,
wherein the second element comprises an additional wavelength selective element configured to split the pump wavelength and the signal wavelength after amplification;
wherein the device is configured to direct a residual pump signal and the amplified external signal to different output ports after splitting.

11. The device of claim 9,
wherein the second element comprises a reflector configured to substantially reflect all incident pump signals;
wherein the device is configured to reflect the residual pump signal towards a part of the second element supporting at least one optical mode that interacts with rare-earth dopants.

12. The device of claim 9,
wherein the first element optical source emits at wavelength substantially equal to one of the 980 nm and 1450 nm;
wherein the rare-earth dopants that interact with at least one optical mode of the second element are erbium.

13. The device of claim 9,
wherein the first element optical source emits at wavelength substantially equal to one of the 808 nm, 869 nm and 1064 nm;
wherein the rare-earth dopants that interact with at least one optical mode of the second element are neodymium.

14. The device of claim 9,
wherein the first element optical source emits at wavelength substantially equal to one of the 910 nm and 975 nm;
wherein the rare-earth dopants that interact with at least one optical mode of the second element are ytterbium.

15. The device of claim 1,
wherein the first element optical source emits at the pump wavelength;
wherein the second element comprises additionally a grating structure interacting with at least one optical mode that interacts with rare-earth dopants in the part of the second element at the signal wavelength and comprises at least one output port configured to support the signal wavelength.

16. The device of claim 15,
wherein the first element optical source emits at wavelength substantially equal to one of the 980 nm and 1450 nm;
wherein the rare-earth dopants that interact with at least one optical mode of the second element are erbium.

17. The device of claim 1,
wherein the first element optical source emits at the pump wavelength;
wherein the second element comprises additionally a passive circuit with at least one ring resonator and comprises at least one output port configured to support the signal wavelength.

18. The device of claim 17,
wherein the first element optical source emits at wavelength substantially equal to one of the 980 nm and 1450 nm;
wherein the rare-earth dopants that interact with at least one optical mode of the second element are erbium.

* * * * *